Patented Mar. 9, 1943

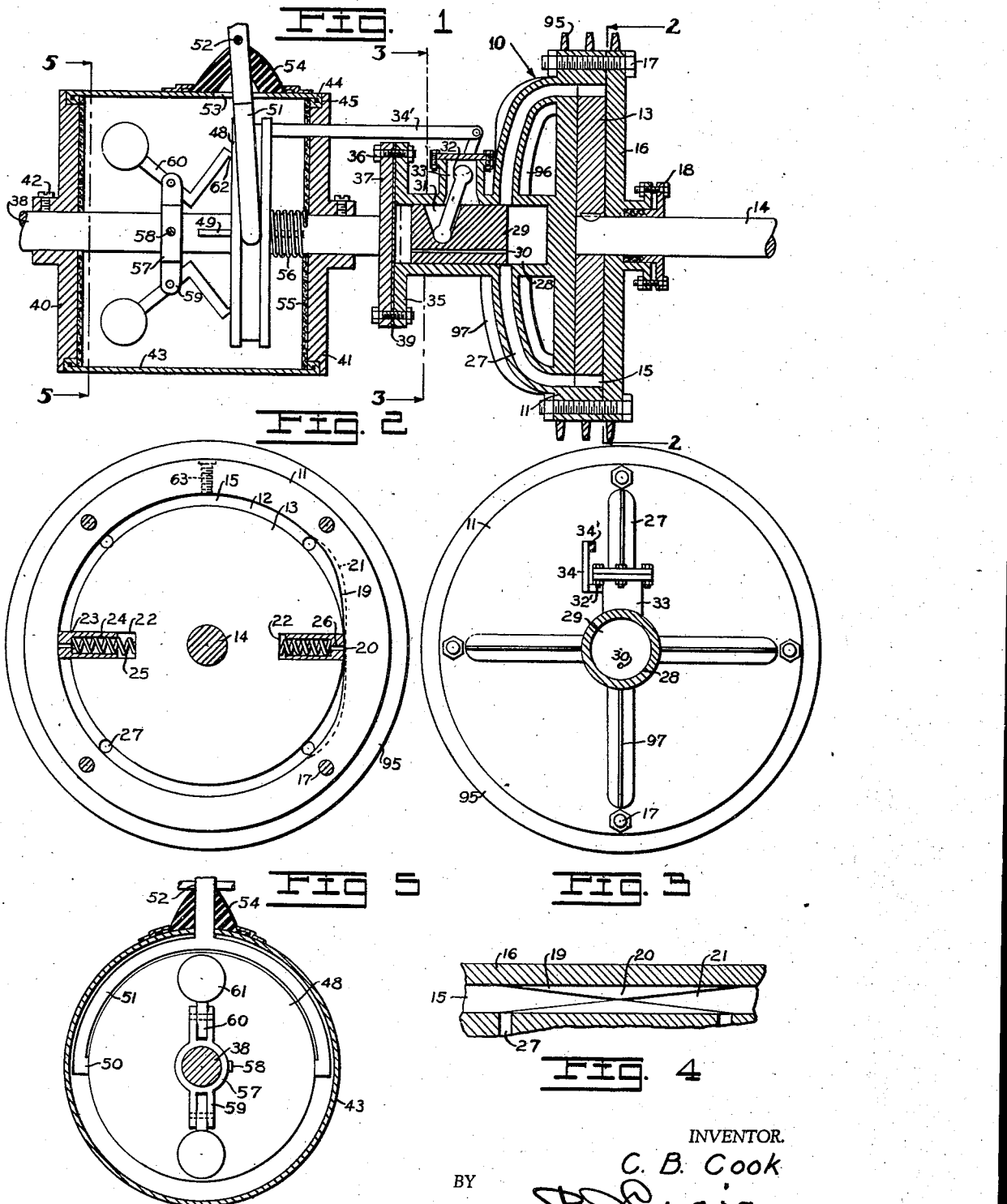

2,313,049

UNITED STATES PATENT OFFICE 2,313,049

HYDRAULIC TRANSMISSION

Charles B. Cook, Los Angeles, Calif.

Application August 25, 1941, Serial No. 408,202

4 Claims. (Cl. 192—58)

This invention relates to hydraulic transmissions.

The general object of the invention is to provide an improved transmission including a driven member and a driving member wherein a novel hydraulic gear connects the members.

A further object of the invention is to provide a novel valve construction for a hydraulic gear.

An additional object of the invention is to provide a hydraulic gear including an outer drive member having cooling means thereon.

Another object of the invention is to provide a novel valve for controlling an hydraulic transmission.

A further object of the invention is to provide a novel governor for controlling the valve of a hydraulic transmission.

Other objects and advantages of my invention will be apparent from the following description taken in connection with the accompanying drawing, wherein:

Fig. 1 is a central vertical sectional view showing a transmission embodying the features of my invention;

Fig. 2 is a view taken on the line 2—2 of Fig. 1;

Fig. 3 is a view taken on the line 3—3 of Fig. 1;

Fig. 4 is a fragmentary inside face view of the housing showing the escape gutters; and Fig. 5 is a view taken on the line 5—5 of Fig. 1.

Referring to the drawing by reference character, I have shown my invention as embodied in a transmission which is indicated generally at 10. As shown, the transmission includes a housing 11 which has a pump chamber 12 therein in which a disk 13 mounted on a shaft 14 rotates. The outer periphery of the disk 13 is spaced inwardly from the outer periphery of the pump chamber 12 thus creating an annular channel 15. The pump chamber 12 is closed by a plate 16 which is secured to the housing 11 by any suitable means such as bolts 17. The shaft 14 extends through the plate 16 which has a packing gland 18 secured thereto and disposed about the shaft 14.

As shown in Fig. 2, a portion of the outer wall of the pump chamber 12 is curved inwardly as at 19 and meets the outer periphery of the disk 13 as at 20. The face of the inwardly curved portions 19 has tapered gutters 21 therein which vanish at the portion 20 as shown in Figs. 2 and 4.

The disk 13 has diametrically opposed slots 22 therein which slidably receive pistons 23, the outer faces of which conform to the curvature of the outer periphery of the pump chamber 12.

The pistons 23 each have a cylindrical bore 24 partially therethrough which receives a compression spring 25 which normally urges the piston outwardly. A smaller pressure equalizing bore 26 communicates with the outer face of the piston and the bore 24.

The housing 11 includes a plurality of conduits 27 which communicate at one end thereof with the channel 15 and at the other end thereof with a valve chamber 28 in the housing 11. A valve 29 slidably fits in the valve chamber 28 and has a small bore 30 therethrough to equalize the pressure on each side thereof as it slides in the chamber. The valve 29 also includes a recess 31 which receives one end of a crank member 32 which is connected to a rod 32' rotatably supported in the wall of the chamber 33 which communicates with the valve chamber 28. The outer end of the rod 32' is connected to a crank arm 34 which is pivoted to a link 34'.

The housing 11 at the end of the valve chamber 28 remote from the pump chamber 12 has a flange 35 thereon which is secured as by bolts 36 to a flange 37 on a shaft 38. A gasket 39 is disposed between the flanges 35 and 37.

Mounted on the shaft 38 I show two circular plates 40 and 41 respectively which are shown as secured to the shaft 38 by set screws 42 and are spaced apart by a stationary cylindrical housing 43 having inturned edges 44 which rotatably engage similarly shaped shoulders 45 in the circular plates 40 and 41. Slidably mounted on the shaft 38 between the plates 40 and 41 and within the housing 43 I show a disk 48 which is prevented from rotating relative to the shaft 38 by means of a key 49. The disk 48 has a circumferential recess therein which slidably receives ears 50 on a clutch yoke 51 which is pivotally supported as at 52. The free ends of the yoke 51 extend through an aperture 53 in the housing 43 and is sealed by a flexible seal 54.

The link 34' extends through the plate 41 and is secured to the disk 48. Thus as the disk 48 is moved along the shaft 38 by means of the yoke 51, the link 34' rotates the crank 32 which in turn moves the valve 29 in the valve chamber 28. The valve is adapted to allow free communication between the conduits 27 when in one position, and to gradually shut off all communication between these conduits when moved to the other position, as shown in Fig. 6.

The plates 40 and 41 each have a layer of felt 55 secured to the inner faces thereof. Mounted about the shaft 38 and disposed between the disk 48 and the plate 41 I show a compression spring 56, the normal force of which may be varied by releasing the set screws 42 and sliding the plates 40 and 41 and the housing 43 along the shaft 38.

About the shaft 38 and between the disk 48 and the plate 40 I show a ring 57 secured to the shaft 38 as by a set screw 58. The ring 57 has diametrically opposed, outwardly extending, slotted ears 59 thereon to each of which is pivoted an L-shaped governor arm 60 which has a ball 61 on the free end thereof and which at the other end thereof have rounded tips 62 which bear against the disk 48. Thus when the shaft 38 rotates, the balls 61 move outwardly and the arms 60 move the disk 48 against the tension spring 56. The valve 29 is thus moved to a partially opened position as shown in Fig. 1 thus permitting more ready communication between the conduits 27. From the foregoing it will be seen that the normal compression of the spring 56 determines the speed of rotation of the shaft 38 at which the governor action will occur.

The channel 15, conduits 27, valve chamber 28 and the chamber 33 are filled with a liquid such as oil through a plug 63 in the housing 11.

Either the shaft 38 or the shaft 14 may be the drive shaft, but shaft 38 is preferably the drive shaft. At low speeds of the drive shaft 38, when the weights 61 are ineffective, the spring 56 maintains the valve in closed position, and the valve is moved from closed to open position manually. At higher speeds of the shaft 38 the valve is urged to open position by the action of the weights. It will thus be seen that when the valve is under manual control it is operated in a manner directly opposite to that effected by the governor or automatic weight control and the manual operation is in fact in opposition to the governor weight action.

In operation, assuming the shaft 38 to be the drive shaft, the valve 28 is manually held in retracted, or open, position, and the shaft 38 is put into rotation thus causing rotation of the entire structure with the exception of the housing 43, the yoke 51, the lever 52, the disk 13 and the shaft 14. As the portions 19 engage the pistons 23, the pistons are forced into their respective slots. Pressure is maintained equal on both ends of each piston 23 since fluid passes from one end to the other through the bore 26. As the housing rotates, the liquid is forced into the two conduits 27 which are directly in advance of the portion 20 and is allowed to escape from the two conduits lying directly behind the portion 20. No liquid is allowed to pass by the portion 20. As the pistons engage the portions 19, the liquid between the piston and the portion 20 is allowed to escape past the piston by means of the gutters 21.

As the valve 29 is manually moved forward to partially closed position and partially blocks communication between the conduits 27, the portion 20 forces the liquid against the piston and thus the disk 13 will start to rotate. As the valve is moved towards closed position, the amount of fluid in circulation decreases and the speed of the driven member increases.

To adjust the speed at which the governor action occurs, the set screws 42 may be loosened and the plates 40 and 41 and the housing 43 slid along the shaft 38 until the desired force is exerted by the spring 56. The screws 42 are then tightened holding the plates 40 and 41 in place.

From the foregoing description it will be apparent that I have invented a novel hydraulic transmission which can be economically manufactured and which is highly efficient for the intended purpose.

Having thus described my invention, I claim:

1. In a hydraulic transmission, a drive shaft, a body mounted on said drive shaft and rotatable therewith, said body having a closed chamber therein, a conduit communicating with opposed portions of said chamber, a driven member rotatable in said chamber and including outwardly extending portions engaging opposed walls of said chamber to thereby force liquid through said chamber and said conduit when said body rotates about said driven member, a valve chamber intermediate the length of said conduit, a valve member slidable in said valve chamber and adapted to control passage of liquid through said conduit whereby hydraulic pressure causes the driven member to rotate, one side of said valve having a tapered recess, a crank, one end of said crank being fitted in said recess, a recess in said valve chamber, said crank being pivoted in and extending through said last mentioned recess, and means to operate said crank.

2. In a hydraulic transmission, a drive shaft, a body mounted on said drive shaft and rotatable therewith, said body having a closed chamber therein, a conduit communicating with opposed portions of said chamber, a driven member rotatable in said chamber and including outwardly extending portions engaging opposed walls of said chamber to thereby force liquid through said chamber and said conduit when said body rotates about said driven member, a valve chamber intermediate the length of said conduit, a valve member slidable in said valve chamber for controlling passage through said conduit whereby hydraulic pressure causes the driven member to rotate, a crank engaging said valve, a link pivotally connected to said crank, a pair of spaced plates secured to said drive shaft and rotatable therewith, a cylindrical housing rotatably engaging said plates, a disk having a peripheral recess and mounted on said drive shaft between said circular plates, said disk being slidable along said drive shaft and rotatable therewith, said link being secured to said disk, a yoke member having ears disposed engaging in said annular recess, a spring disposed about said drive shaft and between one of said circular plates and said disk, a ring secured to said drive shaft between the other of the circular plates and the disk, said ring having fly ball arms thereon engaging said disk whereby when said drive shaft rotates, the disk is moved against the spring, the disk tending to push the link to rotate the crank and thus operate the valve.

3. In a hydraulic transmission, a drive shaft, a body mounted on said drive shaft and rotatable therewith, said body having a closed chamber therein, a conduit communicating with opposed portions of said chamber, a driven member rotatable in said chamber and including outwardly extending portions engaging opposed walls of said chamber to thereby force liquid through said chamber and said conduit when said body rotates about said driven member, a valve chamber intermediate the length of said conduit, a valve member slidable in said valve chamber for controlling passage through said conduit whereby hydraulic pressure causes the driven member to rotate a crank engaging said valve, said valve chamber having a recess, said crank being pivoted in said recess, a link pivotally connected to the outer end of said crank, a pair of spaced circular plates secured to said drive shaft and rotatable therewith, a cylindrical housing rotatably engaging the outer periphery of said circular plates, a disk having an annular recess in the outer periphery thereof and slidably mounted on said drive shaft between said circular plates, said link extending through one of said circular plates and being secured to said disk, a yoke member having ears engaging disposed in said annular recess, said yoke member extending through said housing, a spring disposed about said drive shaft and between one of said circular plates and said disk, a ring secured to said drive shaft between the other of the circular plates and the disk, said ring having opposed outwardly extending ears thereon, fly ball arms pivoted on said last mentioned ears and engaging the adjacent face of the disk at one end thereof whereby when said drive shaft rotates, the balls are urged outwardly by centrifugal force thus urging the remote ends of the L-shaped arms against the disk, and thereby urging the disk against the spring, the disk tending to push the link to rotate the crank and thus operate the valve.

4. In a hydraulic transmission, a drive shaft having a body mounted thereon and rotatable therewith, said body having a chamber therein, a driven shaft coaxial with the drive shaft, a disk rotatable in said chamber and mounted on said driven shaft, the outer periphery of said disk being spaced inwardly from the outer periphery of said chamber thus forming an annular channel therebetween, said chamber being generally cylindrical with a portion of the outer periphery thereof curved inwardly and engaging the outer periphery of the disks to prevent passage of liquid thereby, said inwardly curved portion including tapered gutters therein which vanish at the portion where the chamber wall engaged the disk, said disk having diametrically opposed, inwardly extending slots, a piston in each slot, the outer face of the pistons conforming to the outer periphery of the chamber, means normally urging each piston against the chamber wall, a plurality of conduits each communicating at one end thereof with the chamber on opposed sides of the disk engaging portion, a valve chamber in said body, the other ends of the conduits communicating with said valve chamber, and a valve in said valve chamber and adapted to control communication between said conduits.

CHARLES B. COOK.